(12) United States Patent
Kato

(10) Patent No.: US 7,744,795 B2
(45) Date of Patent: Jun. 29, 2010

(54) SOLUTION CASTING APPARATUS AND METHOD

(75) Inventor: Moritaka Kato, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 4 days.

(21) Appl. No.: 12/058,848

(22) Filed: Mar. 31, 2008

(65) Prior Publication Data

US 2008/0237920 A1    Oct. 2, 2008

(30) Foreign Application Priority Data

Mar. 30, 2007    (JP) .............................. 2007-090724

(51) Int. Cl.
*B29D 7/01*    (2006.01)
(52) U.S. Cl. ................. 264/212; 425/72.1; 425/223
(58) Field of Classification Search ............... 264/212; 425/223, 72.1
See application file for complete search history.

(56) References Cited

U.S. PATENT DOCUMENTS

2004/0212892 A1* 10/2004 Tsujimoto ................. 359/599
2006/0192317 A1*  8/2006 Paulson et al. ............ 264/216

FOREIGN PATENT DOCUMENTS

| DE | 202005006522 U1 | * | 7/2006 |
| JP | 62-115035 | | 5/1987 |
| JP | 2002-103360 | | 4/2002 |
| JP | 2005104148 A | * | 4/2005 |
| WO | WO 2007037463 A1 | * | 4/2007 |

OTHER PUBLICATIONS

English machine translation of JP 2002-103360.*
English machine translation of JP 2005104148 (paragraphs 0001-0037), provided by JPO, retrieved Oct. 16, 2009.*

* cited by examiner

*Primary Examiner*—Joseph S Del Sole
*Assistant Examiner*—Timothy Kennedy
(74) *Attorney, Agent, or Firm*—Young & Thompson

(57) ABSTRACT

A dope containing a polymer and a solvent is discharged as a casting bead from a casting die onto a running (rotating) casting drum to form a casting film. First and second partition plates are provided upstream and downstream from the casting die, respectively. A third partition plate is provided upstream of a peeling roller disposed upstream of the casting die in the rotational direction of the casting drum. Dry air is supplied from a dry air circulator to a drying chamber defined by the second and third partition plates. A side labyrinth seal portion is provided close to the side end surface of the casting drum. A labyrinth seal portion of each of the first to third partition plates and the side labyrinth seal portion prevent dry air from entering the casting chamber even when flow volume of dry air is increased for high-speed casting.

4 Claims, 10 Drawing Sheets the film forming speed is speeded up merely, there is a possibility in that a casting bead becomes unstable, and the surface quality of the obtained film is deteriorated.
SOLUTION CASTING APPARATUS AND METHOD

FIELD OF THE INVENTION

The present invention relates to a solution casting apparatus and method for producing a polymer film.

BACKGROUND OF THE INVENTION

A polymer film (hereinafter referred to as film) has advantages such as excellent light transmission properties and flexibility, and is easy to be made lighter and thinner. Accordingly, the film is widely used as an optical functional film. In particular, a cellulose ester film using cellulose acylate or the like further has advantages such as toughness and low birefringence in addition to the above advantages. Therefore, the cellulose ester film is utilized as a photographic sensitive film, a protective film for a polarizing filter and an optical compensation film as components of a liquid crystal display device (LCD) whose market is increasingly expanded recently.

As a production method of the film described above, in general, solution casting method is used (as disclosed in Japanese Patent Laid-Open Publication No. 62-115035, for example). A film having more excellent properties such as optical properties can be produced in the solution casting method in comparison with other production methods such as a melt extrusion method. In the solution casting method, a polymer solution obtained by dissolving a polymer into various mixed solvents (hereinafter referred to as dope) is discharged from a casting die and cast onto a casting drum to form a casting film. The casting film solidified on the casting drum is peeled as a wet film from the casting drum. Then, the wet film is dried to be wound as a film.

A film production apparatus utilizing the solution casting method houses the casting drum and the casting die in a casing in order to prevent solvent vapor which evaporates from the casting film and is harmful to humans from leaking outside. In a casing, there are provided a first labyrinth seal portion in an upstream side from the casting die in a rotational direction of the casting drum, and a second labyrinth seal portion in a downstream side from the casting die in a rotational direction of the casting drum (as disclosed in Japanese Patent Laid-Open Publication No. 2002-103360, for example). Accordingly, the casing is divided into a casting chamber containing the casting die and a drying chamber for drying a casting film formed on a peripheral surface of the casting drum during the transportation thereof.

A dry air supply duct for introducing dry air is provided in the drying chamber. The dry air introduced into the drying chamber by the dry air supply duct passes through the drying chamber, and exhausted from an exhaust port and a dry air exhaust duct. Thereby, the concentration of the solvent vapor in the drying chamber is kept low, and the drying of the casting film proceeds. Consequently, for the purposed of speeding up the film forming speed, the amount of dry air to be introduced into the drying chamber is increased.

Recently, due to rapid development of a liquid crystal display, a liquid crystal television, and the like, the demand for an optical film for use in the displays and the like has been increased rapidly. Therefore, it is necessary to speed up the film forming speed in order to increase productivity thereof. However, when the film forming speed is speeded up merely, there is a possibility in that a casting bead becomes unstable, and the surface quality of the obtained film is deteriorated. Moreover, in a serious case, the wet film may break and cause interruption and restart of the film production, thus decreasing the productivity.

Therefore, for the purpose of making the casting bead stable, a clearance of the discharge port of the dope in the casting die is made narrower toward the center thereof, and the thickness of the side ends of the casting bead is increased relatively in casting. However, when the thickness of the side ends of the casting bead is increased, the drying efficiency thereof is decreased due to the thickness, and the speed of gelation by cooling becomes slow. Therefore, gel strength corresponding to the peeling cannot be achieved, and in some cases, residue of the casting film which has not been peeled off is left on the casting drum. In this case, the surface of the film is deteriorated, and the breakage of the wet film occurs. Therefore, improvement has been desired.

SUMMARY OF THE INVENTION

In view of the above, an object of the present invention is to provide a solution casting apparatus and method for making casting bead stable in high-speed casting.

To achieve the above object, according to the present invention, there is provided a solution casting apparatus characterized by including: a casting drum continuously rotating; a casing housing the casting drum; casting die for discharging a dope containing a polymer and a solvent as a casting bead onto a peripheral surface of the casting drum; a peeling roller for peeling a casting film as a wet film from the casting drum, the casting film being formed by solidifying the dope, and the wet film being dried to be a film; a first partition member provided in an upstream side from the casting die in a rotational direction of the casting drum in the casing, the first partition member being approximately parallel to the casting die; a second partition member provided in a downstream side from the casting die in the rotational direction of the casting drum in the casing, the second partition member being approximately parallel to the casting die; a chamber formed by the first partition member and the second partition member in the casing so as to surround the casting die; a side labyrinth seal portion provided so as to be close to a side end surface of the casting drum, for preventing dry air from entering the chamber through the side end surface of the casting drum; a clearance adjuster for adjusting a clearance between the side labyrinth seal portion and the side end surface of the casting drum; a dry air supply duct provided in an upstream side from the peeling roller in the rotational direction of the casting drum; a dry air exhaust duct provided at the vicinity of the second partition member outside the chamber; and a dry air circulator provided outside the casing, for circulating dry air between a the dry air supply duct and the dry air exhaust duct.

A speed of air blowing from outside to the chamber through the side labyrinth seal portion is preferably set to at most 5 m/sec at the side labyrinth seal portion. Further, it is preferable that a labyrinth seal portion is provided on the second partition member between the second partition member and the peripheral surface of the casting drum, and a speed of air blowing from outside to the chamber through the labyrinth seal portion provided on the second partition member is set to at most 5 m/sec at the labyrinth seal portion.

It is preferable that a labyrinth seal portion is provided on the first partition member between the first partition member and the peripheral surface of the casting drum, and a speed of air blowing from outside to the chamber through the labyrinth seal portion provided on the first partition member is set to at most 10 m/sec at the labyrinth seal portion. Further, the chamber preferably has a side wind shielding member provided between the first partition member and the second partition member along the rotational direction of the casting drum.

To achieve the above object, according to the present invention, there is provided a solution casting method characterized by including: discharging a dope containing a polymer and a solvent as a casting bead from a casting die onto a peripheral surface of a casting drum continuously rotating in a casing, the casing including a chamber formed by a first partition member and a second partition member each approximately parallel to the casting die so as to surround the casting die, the first partition member being provided in an upstream side from the casting die in a rotational direction of the casting drum and the second partition member being provided in a downstream side from the casting die in the rotational direction of the casting drum; peeling a casting film as a wet film from the casting drum by a peeling roller, the casting film being formed by solidifying the dope; drying the wet film to be a film; supplying dry air from a dry air supply duct provided in an upstream side from the peeling roller in the rotational direction of the casting drum; exhausting air in the chamber by a dry air exhaust duct provided at the vicinity of the second partition member outside the chamber; drying the casting film; and suppressing a blowing air speed of the dry air entering the chamber through the side end surface of the casting drum to at most 5 m/sec by a side labyrinth seal portion provided so as to be close to the side end surface of the casting drum.

It is preferable that a labyrinth seal portion is provided on the second partition member between the second partition member and the peripheral surface of the casting drum, and a speed of air blowing from outside to the chamber through the labyrinth seal portion provided on the second partition member is set to at most 5 m/sec at the labyrinth seal portion.

It is preferable that a labyrinth seal portion is provided on the first partition member between the first partition member and the peripheral surface of the casting drum, and a speed of air blowing from outside to the chamber through the labyrinth seal portion provided on the first partition member is set to at most 10 m/sec at the labyrinth seal portion.

The chamber is preferably formed in the casing by the first partition member, the second partition member, and a side wind shielding member provided between the first partition member and the second partition member along the rotational direction of the casting drum.

According to the present invention, the chamber defined by the first partition member and the second partition member is provided in the casing so as to surround the casting die, the dry air is circulated between the dry air supply duct and the dry air exhaust duct each provided outside the chamber, and the side labyrinth seal portion is provided so as to be close to the side end surface of the casting drum in order to adjust the clearance between the side labyrinth seal portion and the side end surface of the casting drum. Accordingly, even if the introduction amount of the dry air is increased in accordance with the speeding-up of the film forming speed (rational speed of the casting drum), it is possible to prevent the dry air from entering the chamber by the first and second partition members and the side labyrinth seal portion. In particular, according to the present invention, the side labyrinth seal portion makes it possible to prevent the dry air from entering the chamber through the side end surface of the casting drum. As a result, it is possible to suppress the flow volume of dry air directly blown to the casting bead. Further, since the dew point of the solvent vapor at the vicinity of the casting bead can be increased, the evaporation of the solvent vapor from the casting bead can be prevented. Thereby, since it is possible to suppress disturbance and surface deterioration of the casting bead in the high-speed casting and make the casting bead stable, it is possible to produce the film having no thickness unevenness and no surface deterioration.

Additionally, since the speed of air blowing from outside to the chamber through the side labyrinth seal portion is set to at most 5 m/sec at the side labyrinth seal portion, it is also possible to prevent the dry air from entering the chamber through the side end surface of the casting drum.

Further, since the speed of air blowing from outside to the chamber through the labyrinth seal portion provided on the second partition member is set to at most 5 m/sec at the labyrinth seal portion, it is also possible to prevent the dry air from entering the chamber.

Furthermore, since a speed of air blowing from outside to the chamber through the labyrinth seal portion provided on the first partition member is set to at most 10 m/sec at the labyrinth seal portion, it is also possible to prevent the dry air from entering the chamber.

Moreover, since the side wind shielding member is provided between the partition members provided in the upstream side and the downstream side along the rotational direction of the casting drum, it is also possible to prevent the dry air from entering the chamber.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Embodiments of the present invention are described hereinbelow. The present invention, however, is not limited to the following embodiments.

Figure 1:
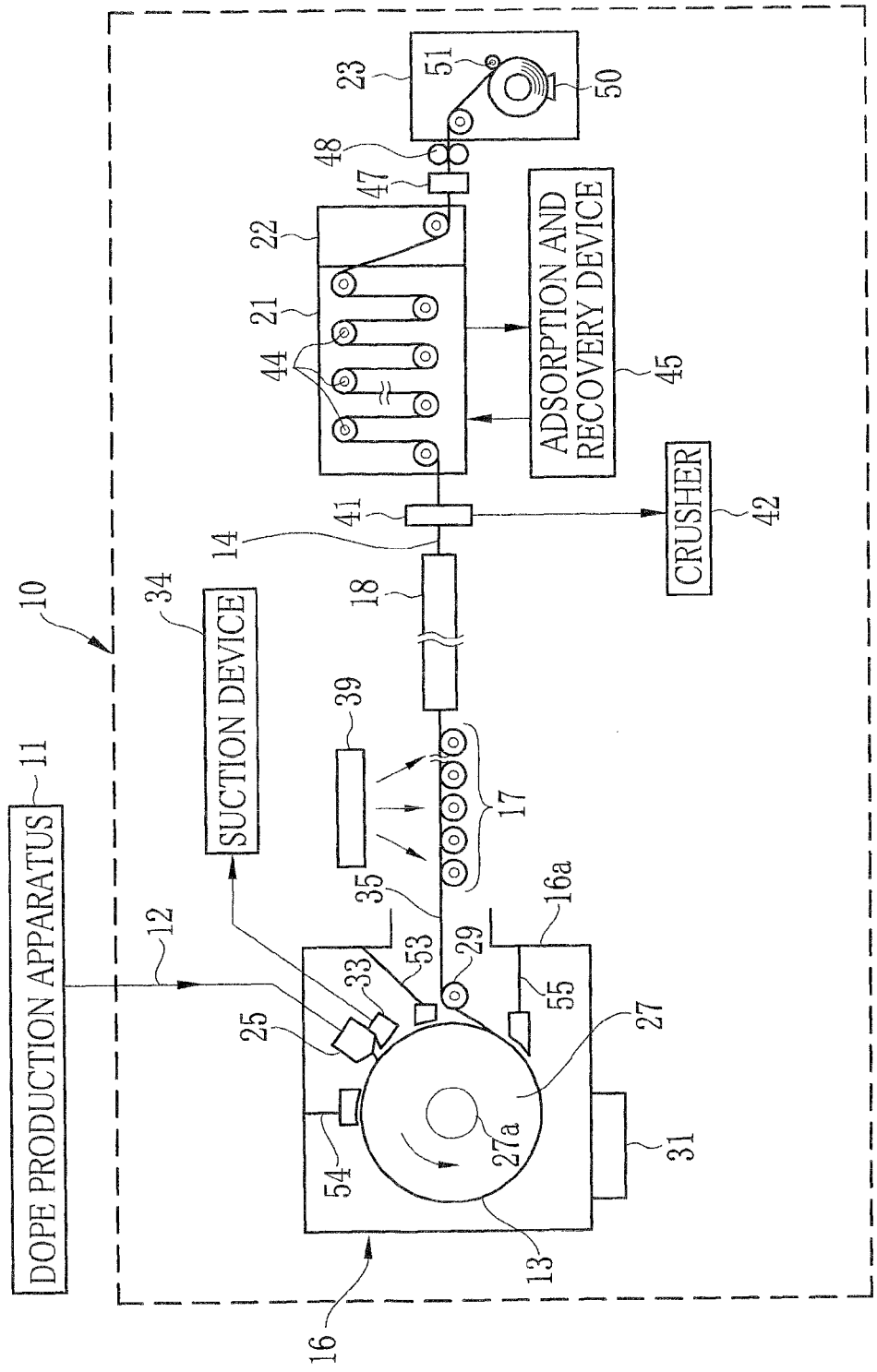
FIG. 1 is a schematic view of a film production apparatus according to an embodiment of the present invention.

As shown in FIG. 1, in a film production apparatus 10, a dope 12 supplied from a dope production apparatus 11 connected thereto with a pipe is cast onto a moving (rotating) casting drum 27 to form a casting film 13, and the casting film 13 is peeled from the casting drum 27 and dried to be a film 14. Main components of the film production apparatus 10 are a casting device 16, a transfer section 17, a tenter device 18, a drying chamber 21, a cooling chamber 22, and a winding chamber 23.

A polymer capable of being a film by a solution casting is dissolved or dispersed into a solvent to prepare a polymer solution or a polymer dispersion liquid. The polymer solution or the polymer dispersion liquid is the dope 12. In this embodiment, the polymer is cellulose acylate, and the solvent is an organic solvent containing dichloromethane as its main component. However, the present invention is not limited thereto, and various kinds of polymers and solvents may be used. Various additives such as a plasticizer are added to the dope 12. The weight ratio of components to be dried and solid, such as cellulose acylate and plasticizer, is 18 to 35 wt %. Further, as the solvent, in addition to dichloromethane, there are organic solvents such as methanol and butanol. The weight ratio of the organic solvents relative to the total solvent is approximately 13 to 25%.

The casting device 16 includes a casing 16a, a casting die (extrusion die) 25, the casting drum 27, a peeling roller 29, a temperature controller 31, and a decompression chamber 33. The casting die 25 discharges the dope 12 supplied from the dope production apparatus 11. The casting film 13 is peeled from the casting drum 27 by the peeling roller 29. The temperature controller 31 controls the inside temperature of the casing 16a. An upstream side from the casting die 25 in the rotational direction of the casting drum 27 is abbreviated as upstream side, and a downstream side from the casting die 25 in the rotational direction of the casting drum 27 is abbreviated as downstream side. The decompression chamber 33 is disposed in the upstream side.

A front end of the casting die 25 includes a slit-like discharge port for discharging the dope 12. Below the discharge port, the casting drum 27 is disposed. The dope 12 discharged from the casting die 25 is cast onto a peripheral surface of the casting drum 27. The casting die 25 is formed of a material having a high resistance to corrosion against electrolyte solution, and a mixing liquid including dichloromethane, and methanol, and low coefficient of thermal expansion (for example, steel product such as SUS 316).

The casting drum 27 having a column shape is rotated around a rotational shaft 27a by a driver (not shown). Thereby, the peripheral surface of the casting drum 27 is rotated at a certain speed (10 to 300 m/min) in a predetermined moving direction. The peripheral surface of the casting drum 27 is subjected to chrome plating treatment and has sufficient resistance to corrosion and strength. Note that, although the dimension, material, and the like of the casting drum 27 are not especially limited, the width of the casting drum 27 is preferably about 1.1 to 2.0 times as that of the dope 12 to be cast. Further, the material of the casting drum 27 preferably has resistance to corrosion and excellent strength.

Each of the casting drum 27 and the rotational shaft 27a thereof includes a flow channel through which a heat transfer medium flows. The heat transfer medium is kept at a desired temperature by a heat transfer medium circulator (not-shown). Thereby, the peripheral surface of the casting drum 27 is kept at a desired temperature, for example, 10° C. or less. Further, the peripheral surface of the casting drum 27 is preferably ground as much as possible such that the casting film 13 having excellent planarity is formed.

The dope 12 is discharged as a casting bead 12a (see FIG. 2) from the casting die 25 to form the casting film 13 on the peripheral surface of the casting drum 27. The casting film 13 is transported at a predetermined moving speed in accordance with the rotation of the casting drum 27. During the transportation of the casting film 13, the inside temperature of the casting chamber 12 is adjusted so as to be approximately constant by the temperature controller 31. Note that the controller 31 may be substituted by a dry air circulator to be described later, and in this case, the controller 31 may be omitted.

The air in the decompression chamber 33 is sucked through a suction tube by the suction device 34 such that the pressure in the upstream side from the casting bead 12a becomes lower than that in the downstream side therefrom. Thereby, a point at which the casting bead 12a reaches the casting drum 27 is fixed without being deviated. According to this embodiment, the decompression chamber 33 is decompressed such that the pressure in the upstream side is lower than that in the downstream side in a range of 400 Pa to 2000 Pa. The casting film 13 is dried and cooled on the casting drum 27 to be solidified. The solidified casting film 13 is peeled from the casting drum 27 by the peeling roller 29 to be a wet film 35. The wet film 35 is transported to the transfer section 17 via a pass roller 37 (see FIG. 2). The surface of the pass roller 37 is formed of Teflon (trademark) in this embodiment.

The transfer section 17 includes a plurality of rollers for supporting and transporting the wet film 35, and an air blower 39 for blowing dry air to the wet film 35 during the transportation of the wet film 35. In the tenter device 18, each side end of the wet film 35 is held by a tenter clip (not shown) to dry the wet film 35. Further, in the tenter device 18, the wet film 35 is stretched in its width direction while being transported. Thereby, the drying of the wet film 35 proceeds, and the wet film 35 is sent as a film 14 to a slitting device 41.

The side ends (edges) of the film 14 are cut off by the slitting device 41. The film 14 whose edges are cut away is sent to the drying chamber 21. The edges thus cut away (side ends of the film) are crushed into chips by a crusher 42 to be reused. The chips to be reused serve as a material of the dope 12.

The drying chamber 21 is provided with a plurality of pass rollers 44. The film 14 is bridged over the pass rollers 44 such that the both surfaces of the film 14 are dried evenly. Note that solvent vapor is generated from the film 14 during the drying. The solvent vapor is adsorbed and recovered by an adsorption and recovery device 45 disposed outside the drying chamber 21. The dried film 14 is guided to the cooling chamber 22 and cooled therein until its temperature becomes an approximately room temperature.

A compulsory neutralization device (neutralization bar) 47 is provided in the downstream side from the cooling chamber 22. The compulsory neutralization device 47 eliminates static electricity from the film 14. Further, a knurling roller 48 is disposed in the downstream side from the compulsory neutralization device 47. The knurling roller 48 is used to apply knurling on the both side ends of the film 14 by embossing.

The film 14 subjected to neutralization of static electricity and knurling is wound by a winding roller 50 disposed in the winding chamber 23. Moreover, a press roller 51 for pressing the film 14 during the winding is provided on the outer peripheral surface of the winding roller 50 in the winding chamber 23.

Figure 2:
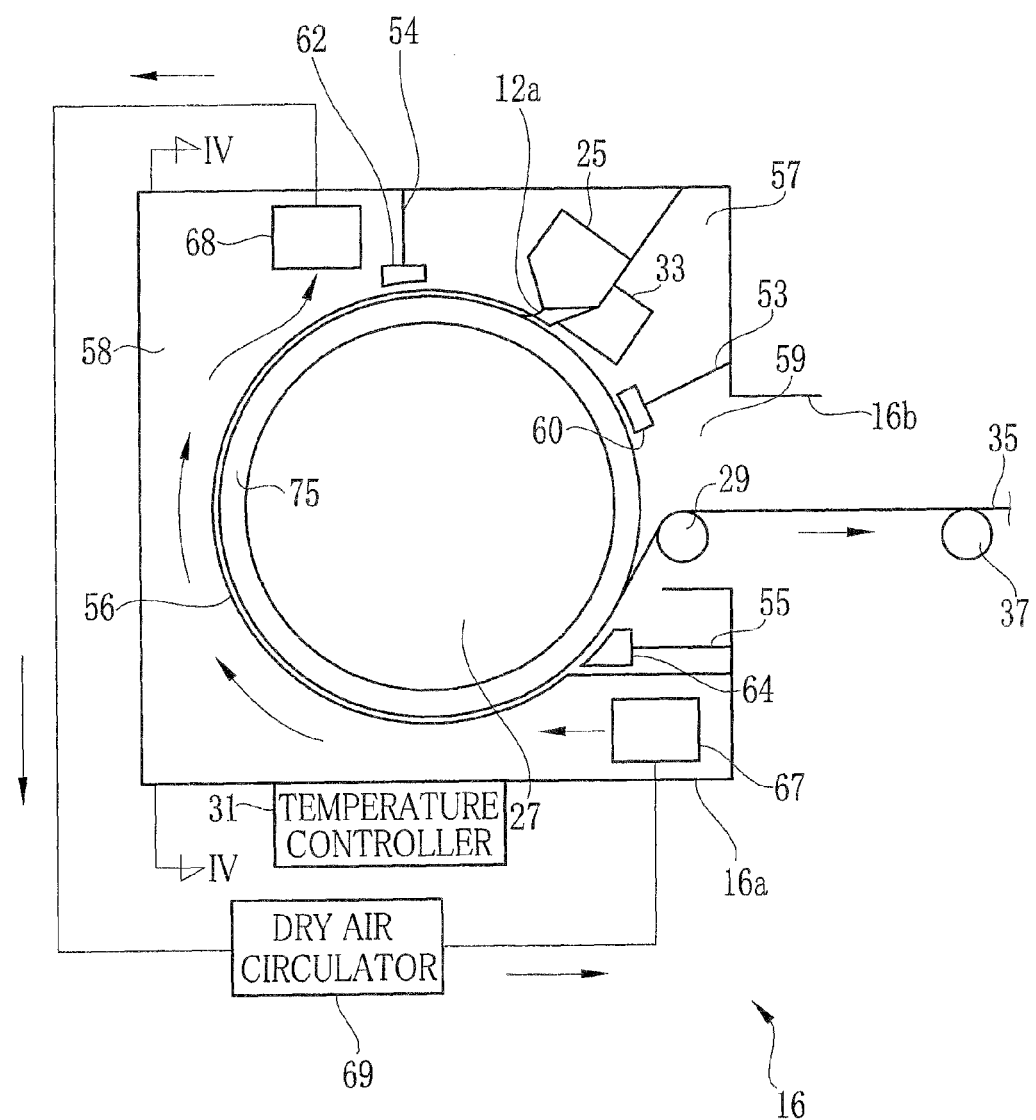
FIG. 2 is a cross sectional view of a casting device.
Figure 3:
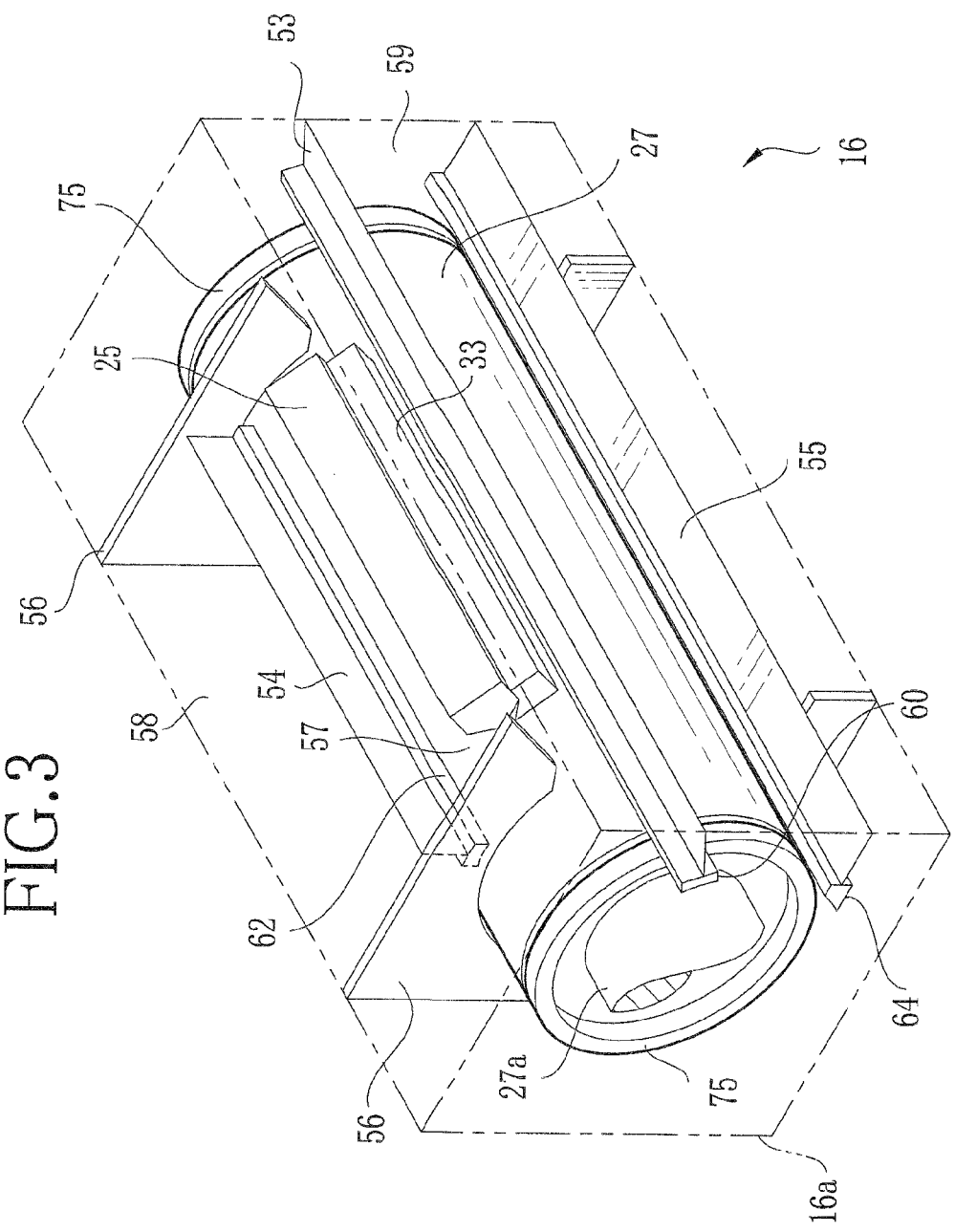
FIG. 3 is a perspective view of the casting device.
Figure 4:
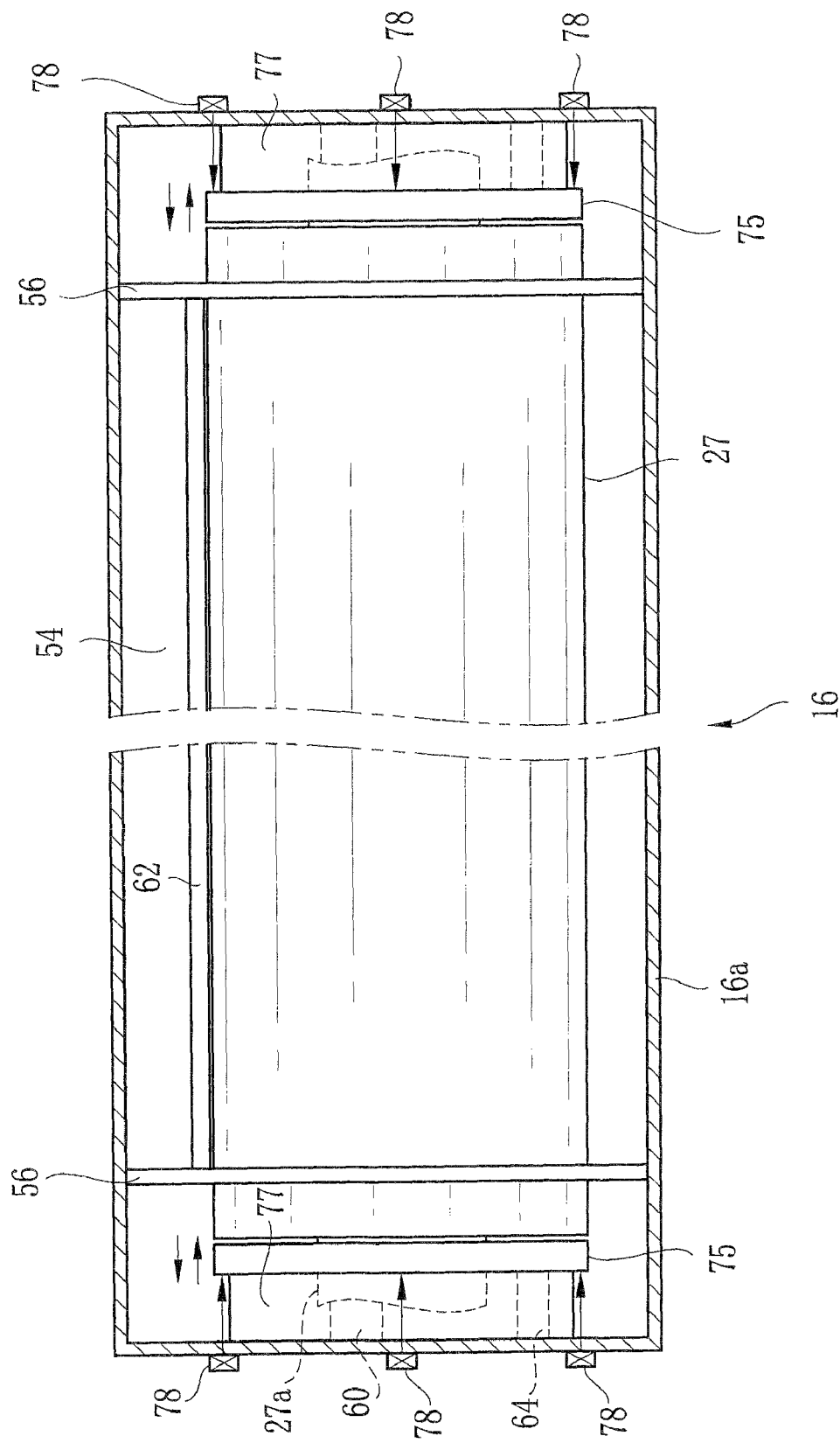
FIG. 4 is a cross-sectional view of FIG. 2 taken along the line IV-IV.

As shown in FIGS. 2 to 4, the inside of the casing 16a is divided into three areas by first to third partition plates (partition members) 53 to 55 and a side wind shielding plate (side wind shielding member) 56. Concretely, the three areas are a casting chamber 57 (first chamber) including the casting die 25 and the decompression chamber 33, a drying chamber 58 for drying the casting film 13 formed in the casting chamber 57, and peeling chamber 59 including the peeling roller 29 and an outlet port 16b for the wet film 35.

The side wind shielding plate 56 is disposed so as to extend from the lateral side of the casting die 25 to the third partition plate 55 along the rotational direction of the casting drum 27 so as to surround the casting die 25 therein. The side wind shielding plate 56 suppresses flow volume of dry air and the like entering from the lateral side of the casting chamber 57. Moreover, the side wind shielding plate 56 defines both lateral sides of the drying chamber 58 to prevent the solvent vapor evaporated from the casting film 13 from leaking outside of the drying chamber 58.

The casting chamber 57 is defined by the first partition plate 53 disposed in the upstream side from the casting die 25 and the decompression chamber 33, the second partition plate 54 disposed in the downstream side from the casting die 25, and the side wind shielding plate 56 so as to surround the casting die 25. The first partition plate 53 is parallel to the casting die 25 (axial direction of the casting drum 27), and both sides thereof contact with the side plate of the casing 16a. Additionally, the front end of the first partition plate 53 is provided with a first labyrinth seal portion 60.

A plurality of fins are formed in the first labyrinth seal portion 60 (also in the second and third labyrinth seal portions 62 and 64). The fins are long plates and parallel to the casting die 25. The first labyrinth seal portion 60 prevents the dry air and the like in the upstream side from the casting chamber 57 from entering the casting chamber 57. Further, the clearance between the first labyrinth seal portion 60 and the peripheral surface of the casting drum 27 can be adjusted.

The both sides of the second partition plate 54 contact with the side wind shielding plate 56. The front end of the second partition plate 54 is provided with a second labyrinth seal portion 62. The second labyrinth seal portion 62 prevents the dry air and the like in the downstream side from the casting chamber 57 from entering the casting chamber 57. Further, it is also possible to adjust the clearance between the second labyrinth seal portion 62 and the peripheral surface of the casting drum 27.

The drying chamber 58 is defined by the second partition plate 54, the third partition plate 55 disposed in the upstream side from the peeling roller 29, and the side wind shielding plate 56. The third partition plate 55 is parallel to the casting die 25. The sides thereof contact with the side plate of the casing 16a. The front end of the third partition plate 55 is provided with a third labyrinth seal portion 64. It is also possible to adjust the clearance between the third labyrinth seal portion 64 and the peripheral surface of the casting drum 27. The third labyrinth seal portion 64 prevents the dry air and the like from entering the peeling chamber 59.

Moreover, a dry air supply duct 67 is provided at the vicinity of the third partition plate 55 and a dry air exhaust duct 68 is provided at the vicinity of the second partition plate 54 in the drying chamber 58 (see FIG. 2). The dry air supply duct 67 and the dry air exhaust duct 68 are connected to a dry air circulator 69.

The dry air circulator 69 supplies dry air to the drying chamber 58 through the dry air supply duct 67. The dry air supplied to the drying chamber 58 passes through the drying chamber 58 and returns to the dry air circulator 69 through the dry air exhaust duct 68. At this time, solvent vapor evaporated from the casting film 13 in the drying chamber 58 is also sent to the dry air circulator 69 together with the dry air. The dry air circulator 69 has a function for recovering the solvent vapor contained in the dry air. The dry air, from which the solvent vapor component is removed, is introduced again to the drying chamber 58 through the dry air supply duct 67.

As described above, the dry air is circulated between the dry air supply duct 67 and the dry air exhaust duct 68 by the dry air circulator 69. Accordingly, the concentration of the solvent vapor contained in the drying chamber 58 is kept at a low level, and the drying of the casting film 13 proceeds. In a case where a film is formed at a high speed as described above, flow volume of dry air to be introduced to the drying chamber 58 is increased in accordance with the speeding-up of the film forming speed (rotation speed of the drum). The flow volume of dry air in accordance with the rotation speed of the drum is decided based on experiment preliminarily conducted or the like.

The peeling chamber 59 is defined by the first partition plate 53 and the third partition plate 55 to be an exit of the film from the casting device 16. The third labyrinth seal portion 64 prevents the dry air introduced into the drying chamber 58 from entering the peeling chamber 59, and therefore it is also possible to dry air and the like from entering the casting chamber 57 through the peeling chamber 59. Moreover, it is also possible to prevent the solvent vapor generated in the drying chamber 58 from entering the drying chamber 59 together with the dry air and leaking outside through the outlet port 16b. Note that an air curtain (not shown) or the like is provided at the outlet port 16b as needed for the purpose of preventing the solvent vapor from leaking outside. The casting chamber 16, the tenter device 18, the drying chamber 21, the cooling chamber 22, and the winding chamber 23 are disposed indoors such that no solvent vapor leaks outside.

Figure 5:
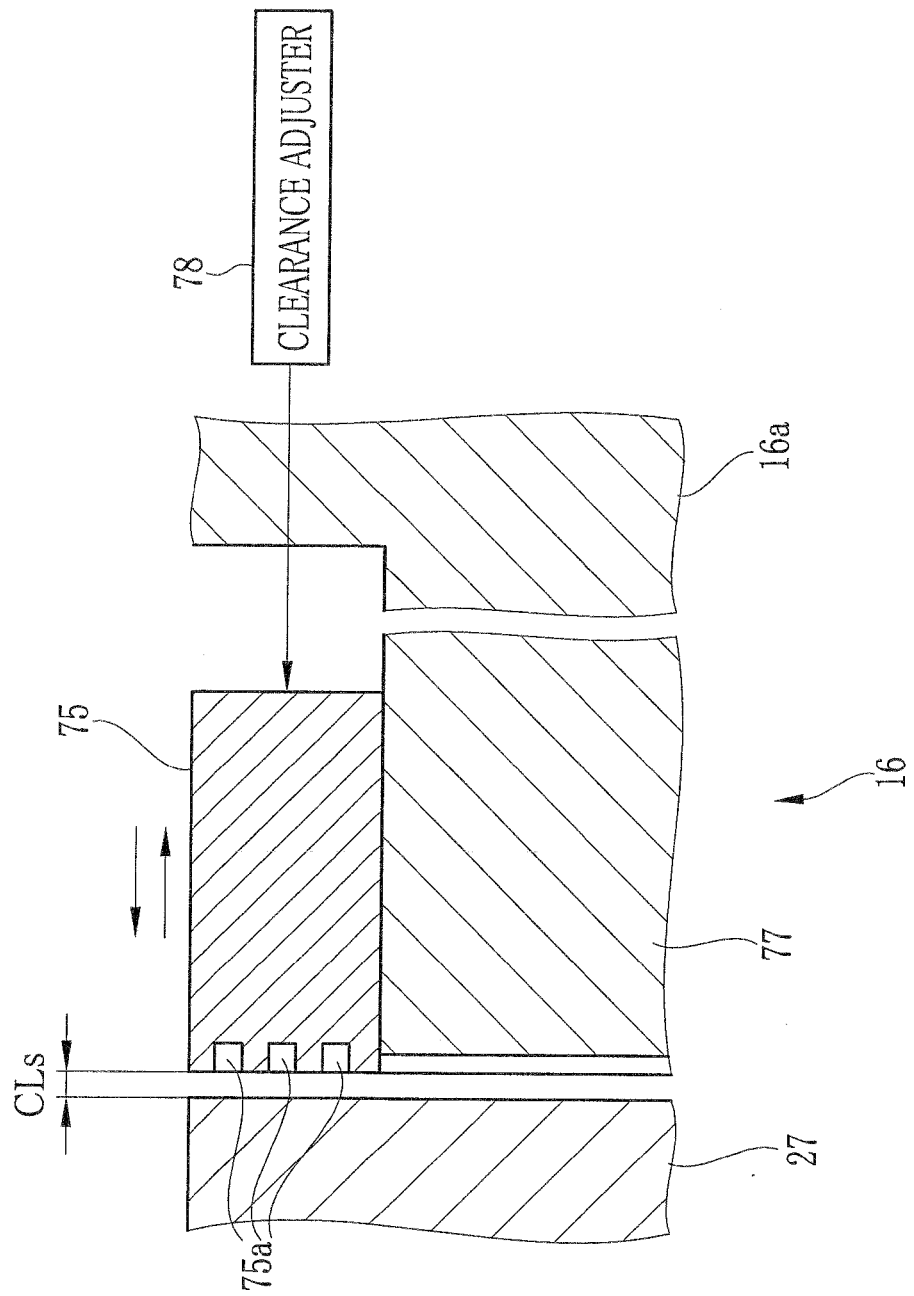
FIG. 5 is an enlarged view of a side labyrinth seal portion.

Next, a side labyrinth seal portion 75 is described referring to FIGS. 3 to 5. As described above, when the volume of dry air to be introduced to the drying chamber 58 is increased in accordance with the speeding-up of the film forming speed, the pressure in the drying chamber 58 is extremely higher than that in the casting chamber 57. As a result, in comparison with cases of the drying chamber 58 and the peeling chamber 59, the dry air enters the casting chamber 57 through the side end surfaces of the casting drum 27 more frequently. In view of the above, the side labyrinth seal portion 75 is used to prevent the dry air from entering the casting chamber 57 through the side end surfaces of the casting drum 27.

The side labyrinth seal portion 75 is disposed at a position close to the side end surfaces of the casting drum 27. The side labyrinth seal portion 75 is an approximately ring formed of Teflon (trademark) or the like along the periphery of side end surfaces of the casting drum 27. The outer diameter of the side labyrinth seal portion 75 is approximately equal to a diameter of the casting drum 27. The inner diameter thereof is formed sufficiently larger than the diameter of the rotational shaft 27a. Additionally, a plurality of labyrinth grooves 75a (see FIG. 5) are formed in a concentric manner on the surface of the side labyrinth seal portion 75 at the side opposed to the casting drum 27 (hereinafter abbreviated as the side of the drum).

As shown in FIGS. 4 and 5, an approximately circular seal holding portion 77 is formed on an inner wall surface (side plates) of the casing 16a. The seal holding portion 77 fits into a hollow portion of the side labyrinth seal portion 75. The side labyrinth seal portion 75 is held with its center corresponding to the center of the casting drum 27 (rotational shaft 27a) such that its position is adjustable in the axial direction of the casting drum 27 by the seal holding portion 77. Note that, as long as the side labyrinth seal portion 75 can be held such that its position is adjustable, the number of the seal holding portions 77 and the shape thereof are not especially limited.

A plurality of clearance adjusters 78 are provided outside the casing 16a. Each of the clearance adjusters 78 is formed of a motor, a feed screw, a female screw, a slide shaft, and the like, for example. The feed screw is rotated by the motor to slide the slide shaft through the female screw engaged with the feed screw, and then the position of the side labyrinth seal portion 75 fixed to the slide shaft is adjusted in the axial direction of the casting drum 27. Thereby, a clearance (CLs)

(see FIG. 5) between the side labyrinth seal portion 75 and the side end surfaces of the casting drum 27 can be adjusted arbitrarily. The side labyrinth seal portion 75 is made close to the side end surfaces of the casting drum 27 as described above, and thereby it is possible to suppress volume of dry air leaked from the side end surfaces of the casting drum 27 by use of the labyrinth groove 75a.

Note that, in addition to the above, the clearance adjuster 78 may be various mechanisms as long as the position of the side labyrinth seal portion 75 is adjustable. Further, although the clearance adjuster 78 is disposed outside the casing 16a in this embodiment, the clearance adjuster 78 may be disposed inside the casing 16a.

It is possible to adjust blowing air speed Vs of the dry air and the like blown toward the casting chamber 57 from the clearance CLs by adjusting the clearance CLs. Upon increase in size of the clearance CLs, the sealing effect of the side labyrinth seal portion 75 is decreased, and therefore the blowing air speed V1 is increased and the flow volume of dry air entering the casting chamber 57 through the side end surfaces of the casting drum 27 is also increased. On the contrary, upon decrease in size of the clearance CLs, the sealing effect of the side labyrinth seal portion 75 is increased, and therefore the blowing air speed Vs is decreased and the flow volume of dry air entering the casting chamber 57 through the side end surfaces of the casting drum 27 is also decreased.

The clearance CLs is adjusted such that the blowing air speed V1 is preferably set to at most 5 m/sec, and more preferably at most 2 m/sec. For example, data table in which the rotation speed of the casting drum 27, the flow volume of dry air to be introduced to the drying chamber 58, the clearance CLs, and the blowing air speed V1 are related to each other is obtained preliminarily in an experiment, and then based on the data table, the clearance CLs may be adjusted in accordance with the rotation speed and the flow volume of dry air (the same holds for clearances CL1 to CL3 mentioned below).

Figure 6:
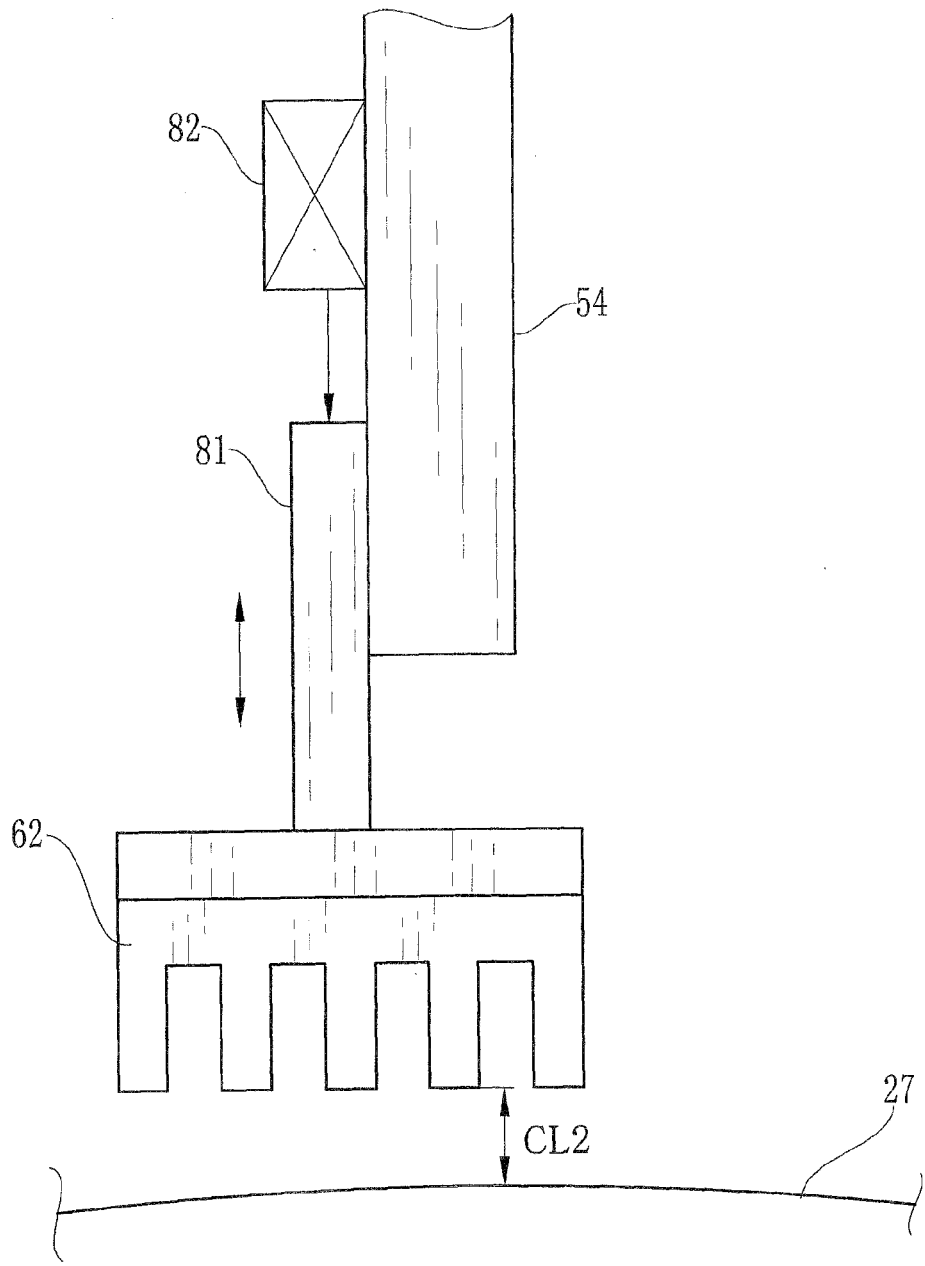
FIG. 6 is an enlarged side view showing a second partition plate, a second labyrinth seal portion, and a second extended seal portion.

Moreover, in order to suppress the flow volume of dry air entering the casting chamber 57, the clearance CL1 from the peripheral surface of the casting drum 27 to the first labyrinth seal portion 60, the clearance CL2 from the peripheral surface of the casting drum 27 to the second labyrinth seal portion 62, and clearance CL3 from the peripheral surface of the casting drum 27 to the third labyrinth seal portion 64 are also adjusted. Hereinbelow, the adjusters for clearances CL1 to CL3 are described by taking the adjuster for clearance CL2 shown in FIG. 6 as an example.

The front end of the second partition plate 54 is provided with a support bracket 81 with the intermediation of a not-shown guide groove or the like such that the position of the support bracket 81 is adjustable. The second labyrinth seal portion 62 is fixed to one end of the support bracket 81, and a clearance adjuster 82 is connected to the other end thereof. The clearance adjuster 82 is disposed on the second partition plate 54.

As in the case of the clearance adjuster 78 described above basically, the clearance adjuster 82 includes a motor, a feed screw, a female screw, a slide shaft, and the like, for example. The clearance adjuster 82 moves the support bracket 81 and the second labyrinth seal portion 62 integrally to adjust the clearance CL2. Note that the feed screw may be rotated manually instead of using the motor in order to adjust the clearance CL2.

According to this embodiment, the clearance CL2 is adjusted such that the blowing air speed V2 of the dry air and the like blown to the casting chamber 57 from the clearance CL2 is preferably set to at most 5 m/sec, and more preferably at most 3 m/sec.

The clearances CL1 and CL3 are adjusted by the same clearance adjuster. The clearances CL1 and CL3 are adjusted such that the blowing air speed V1 of the dry air and the like (including accompanied air) blown to the casting chamber 57 from the clearance CLd1 and the blowing air speed V3 of the dry air and the like blown to the peeling chamber 59 from the clearance CL3 are preferably set to at most 10 m/sec, and more preferably at most 5 m/sec, respectively.

The blowing air speed of dry air and the like from clearances CLs and CL1 to CL3 are adjusted as described above, and accordingly, the flow volume of dry air entering the casting chamber 57 is suppressed. Thereby, the flow volume of dry air directly blown to the casting bead 12a is suppressed. Moreover, since the concentration (dew point) of solvent vapor in the casting chamber 57, that is, at the vicinity of the casting bead 12a is increased, it is possible to prevent the solvent vapor in the casting bead 12a from evaporating. As a result, the disturbance and deterioration of surface quality of the casting bead 12a can be prevented, and the shape of the casting bead 12a is kept stable. Note that the dew point of the solvent vapor in an area within 100 mm to 200 mm away from the casting bead 12a is adjusted so as to be in the range of −15° C. to 0° C.

Next, an example of a method for producing a film 14 by the film production apparatus 10 (see FIG. 1) is described. When the film production apparatus 10 starts to be operated, the casting drum 27 is rotated at a predetermined speed, for example, 50 m/min or more. At this time, the temperature of the peripheral surface of the casting drum 27 is kept at 10° C. or less by a heat transfer medium circulator (not shown). Further, the dry air circulator 69 (see FIG. 2) start to be operated, and dry air whose volume corresponds to the rotation speed of the casting drum 27 (film forming speed) is circulated between the dry air supply duct 67 and the dry air exhaust duct 68.

Next, the dope 12 is supplied from the dope production apparatus 11 to the casting die 25, and then the dope 12 is discharged as the casting bead 12a from the casting die 25. Accordingly, the casting film 13 is formed on the peripheral surface of the casting drum 27. At this time, the suction device 34 is actuated to cause the decompression chamber 33 to decompress the casting bead 12a in the upstream side from the casting die 25 such that the pressure in the upstream side is lower than that in the downstream side in a range of 400 Pa to 2000 Pa.

According to this embodiment, during the casting, the side labyrinth seal portion 75 is made close to the side end surfaces of the casting drum 27, and the clearance CLs is adjusted such that the blowing air speed Vs is set to at most 5 m/sec (preferably at most 2 m/sec). Thereby, it is possible to prevent the dry air from entering the casting chamber 57 through the side end surfaces of the casting drum 27.

Moreover, according to this embodiment, the first to third partition plates 53 to 55, the first to third labyrinth seal portions 60, 62, 64, and the side wind shielding plate 56 divide the casing 16a into the casting chamber 57, the drying chamber 58, and the peeling chamber 59. Additionally, the clearances CL1 to CL3 are adjusted such that the blowing air speed V2 is set to at most 5 m/sec (preferably at most 3 m/sec), and the blowing air speeds V1 and V3 are at most 10 m/sec (preferably at most 5 m/sec). Thereby, it is possible to prevent the dry air from entering the casting chamber 57.

As described above, even if the flow volume of dry air introduced to the drying chamber 58 is increased in accordance with the speeding-up of the rotation speed of the casting drum 27 (film forming speed), it is possible to prevent the dry air from entering the casting chamber 57. Therefore, it is possible to suppress the flow volume of dry air directly blown to the casting bead 12a and increase the gas dew point in the area within 100 m to 200 m away from the casting bead 12a. Thereby, when the film is formed at a high speed, for example, at a rotation speed of the casting drum 27 of 100 m/sec or more, it is possible to prevent disturbance and deterioration of surface quality of the casting bead 12a to keep the shape of the casting bead 12a stable. Moreover, since it is possible to suppress the flow volume of dry air directly blown to the casting bead 12a, the effect of keeping the casting bead 12a stable can be achieved, in particular in forming a thin film. Since the casting bead 12a is kept stable as described above, it is possible to prevent the occurrence of thickness unevenness and surface deterioration of the film 14.

The casting film 13 formed on the peripheral surface of the casting drum 27 passes through the drying chamber 58 to be cooled and turns into gel state. The drying thereof also proceeds. After being solidified, the casting film 13 is peeled from the casting drum 27 by the peeling roller 29, and thus the wet film 35 can be obtained.

The wet film 35 is sent to the transfer section 17 by the support of the pass roller 37. Note that the wet film 35 peeled from the casting drum 27 is transported at a speed 1.03 to 1.20 times as fast as that when being transported on the casting drum 27. The wet film 35 is dried in the transfer section 17 and the tenter device 18, and then transported as the film 14 to the slitting device 41. The edges of the film 14 are cut off by the slitting device 41, and then the film 14 is transported to the drying chamber 21.

The film 14 is dried in the drying chamber 21 and guided to the cooling chamber 22. In the cooling chamber 22, the film 14 is cooled until its temperature becomes approximately room temperature. Subsequently, after the film 14 is subjected to neutralization by the compulsory neutralization device 47 and knurling by the knurling roller 48, the film 14 is wound by the winding roller 50 disposed in the winding chamber 23.

Note that, although the side labyrinth seal portion 75 is approximately ring-shape in the above embodiment, the present invention is not limited thereto, and may be any shape as long as the shape of the side labyrinth seal portion 75 makes it possible to prevent the dry air from entering the casting chamber 57 through the side end surfaces of the casting drum 27.

Further, although the labyrinth grooves 75a are formed on the surface of the side labyrinth seal portion 75 at the side of the casting drum 27 in this embodiment, the present invention is not limited thereto. The labyrinth grooves 75a may be formed in a concentric manner on the side end surfaces of the casting drum 27.

Figure 7:
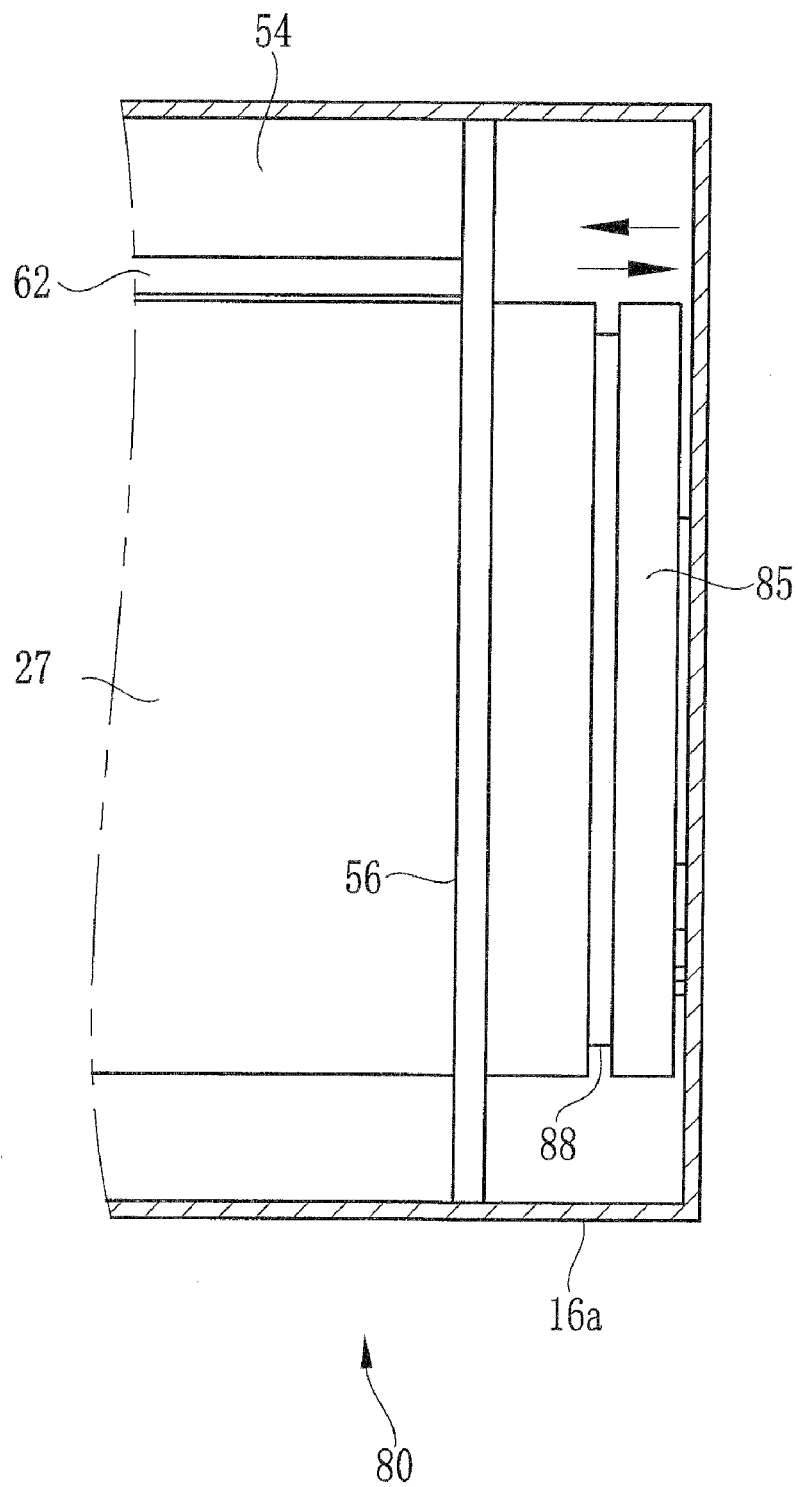
FIG. 7 is a cross sectional view of a casting device provided with a side labyrinth seal portion on a casting drum according to another embodiment of the present invention.

Note that the side labyrinth seal portion 75 is attached to the seal holding portion 77 such that its position is adjustable in the above embodiment, the present invention is not limited thereto. For example, as in the case of a casting device 80 shown in FIGS. 7 to 9, a side labyrinth seal portion 85 may be attached to the casting drum 27 such that its position is adjustable. Note that the same reference numerals are given to the components having the same function as those in the above embodiment, and the description thereof will be omitted.

The side labyrinth seal portion 85 is an approximately ring-shape as in the case of the side labyrinth seal portion 75 described above. An approximately circular seal holding portion 88 is formed on the side end surfaces of the casting drum 27. The seal holding portion 88 fits into a hollow portion of the side labyrinth seal portion 85. The position of the side labyrinth seal portion 85 is adjustable in the axial direction of the casting drum 27. A plurality of labyrinth grooves 85a (see FIGS. 8 and 9) are formed on the surface of the side labyrinth seal portion 85 at the side opposed to the casting drum 27.

Figure 8:
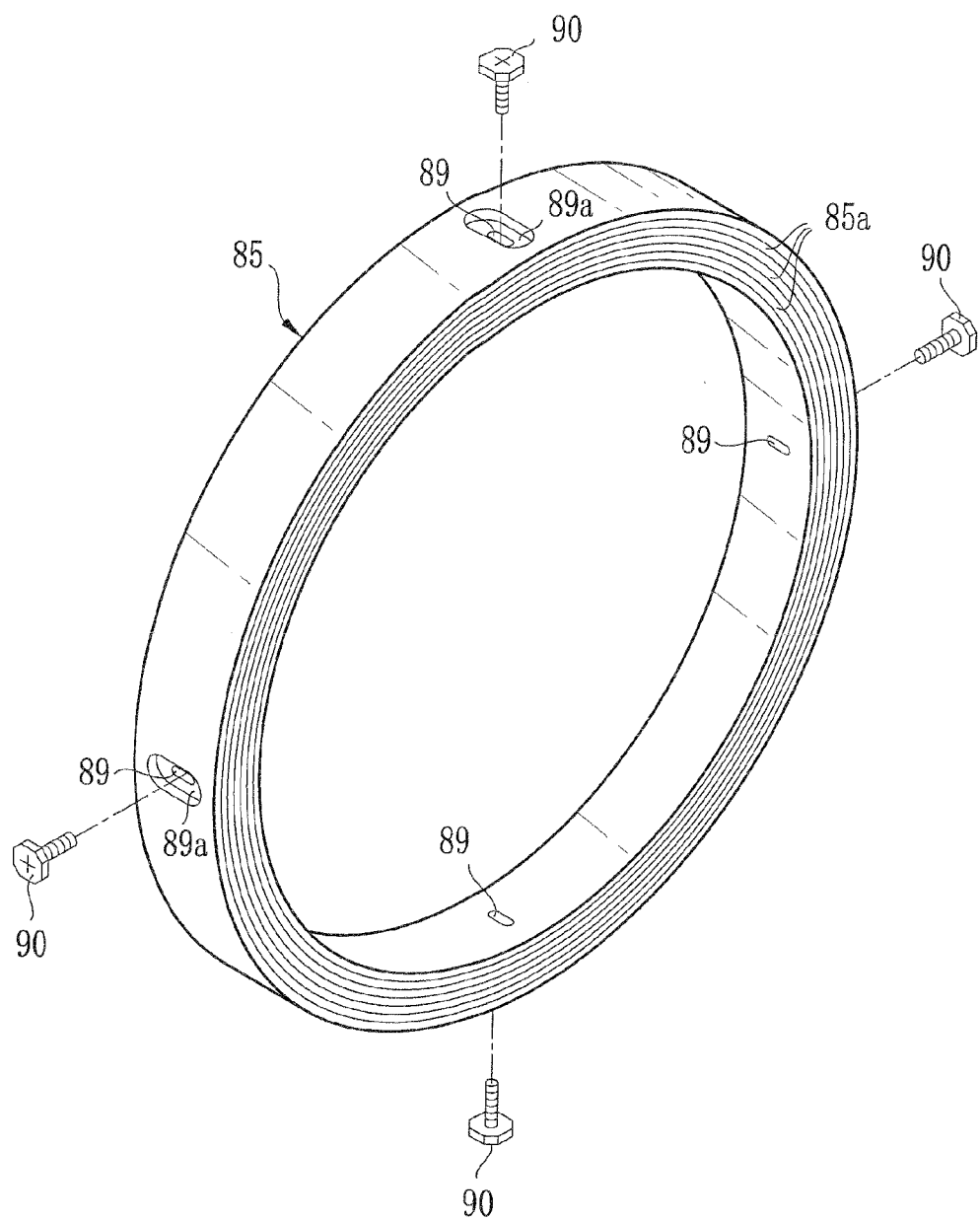
FIG. 8 is a perspective view of the side labyrinth seal portion of FIG. 7.
Figure 9:
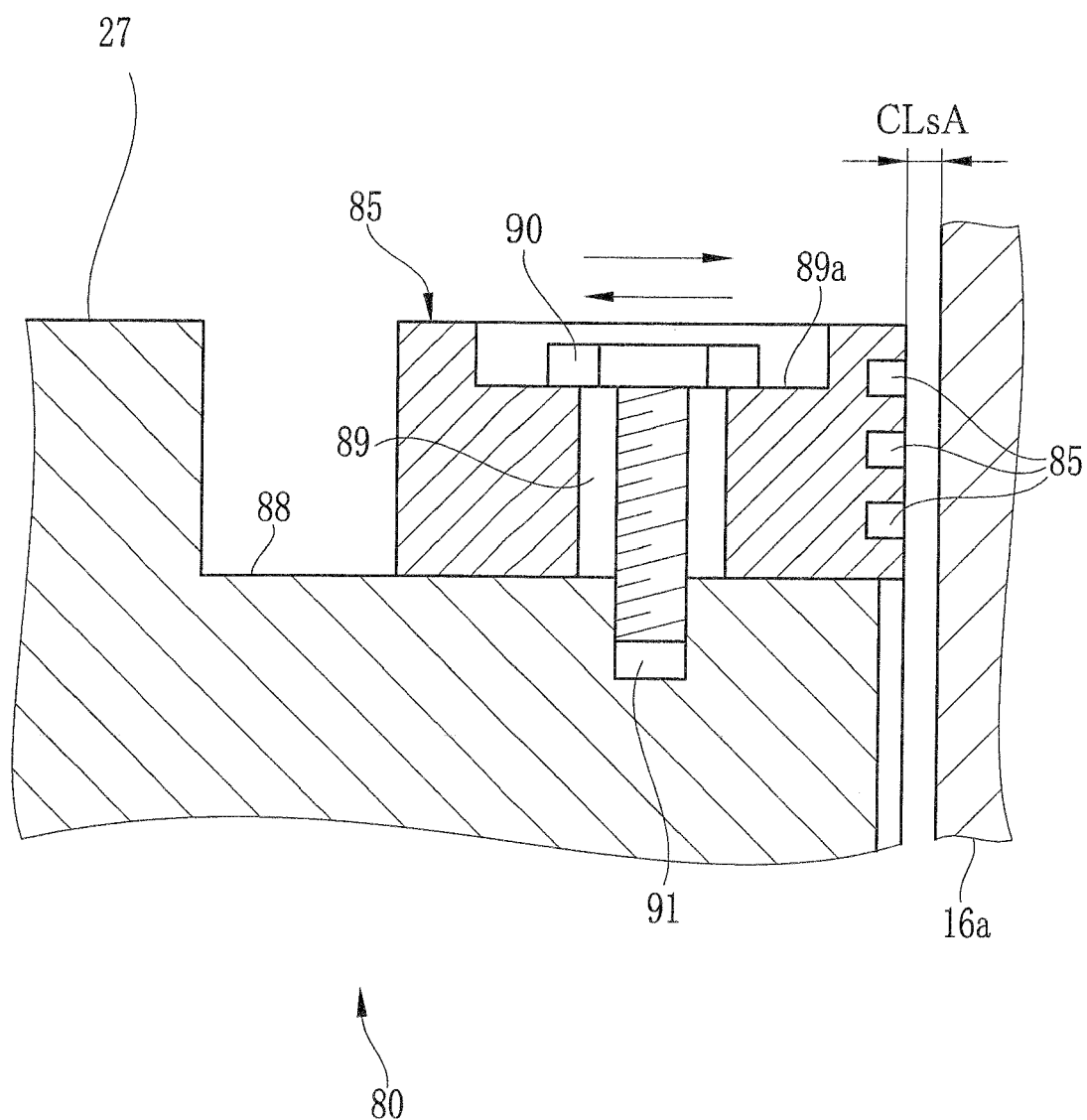
FIG. 9 is an enlarged view of the side labyrinth seal portion of FIG. 7.

Further, insertion holes 89 are formed on the side labyrinth seal portion 85 (see FIGS. 8 and 9). A bolt 90 is inserted into each of the insertion holes 89, and the bolt 90 is screwed into a bolt hole 91 formed on a peripheral surface of the seal holding portion 88 with the intermediation of the side labyrinth seal portion 85. Note that each of the insertion holes 89 extends longer than the diameter of the bolt 90 in a direction parallel to the casting die 25. Further, an opening 89a of each of the insertion holes 89 at the side of the outer peripheral surface of the side labyrinth seal portion 85 is large enough to contain a top portion of the bolt 90. Note that, although the number of insertion holes 89 formed on the side labyrinth seal portion 85 is four in this embodiment, the number may be three or less, or more than five.

The position of the side labyrinth seal portion 85 can be adjusted along the seal holding portion 88 by loosing each of the bolts 90. Thereby, a clearance CLsA between the side labyrinth seal portion 85 and the casing 16a can be adjusted. Namely, the clearance adjuster of the present invention includes the insertion hole 89, the bolt 90, and the bolt hole 91. The clearance CLsA is adjusted such that the air blowing speed VsA of dry air and the like blown toward the casting chamber 57 is preferably at most 5 m/sec, and more preferably at most 2 m/sec. When the adjustment of the clearance CLsA is completed, each of the bolts 90 is fastened, and thereby the side labyrinth seal portion 85 is fixed to the seal holding portion 88.

Even when the side labyrinth seal portion 85 is attached to the seal holding portion 88 (casting drum 27) such that its position is adjustable as described above, as in the case of the above embodiment, it is possible to prevent the dry air from entering the drying chamber 57 through the side end surfaces of the casting drum 27. In this case, instead of forming the labyrinth grooves 85a on the side labyrinth seal portion 85, labyrinth grooves may be formed on an inner wall of the casing 16a.

Figure 10:
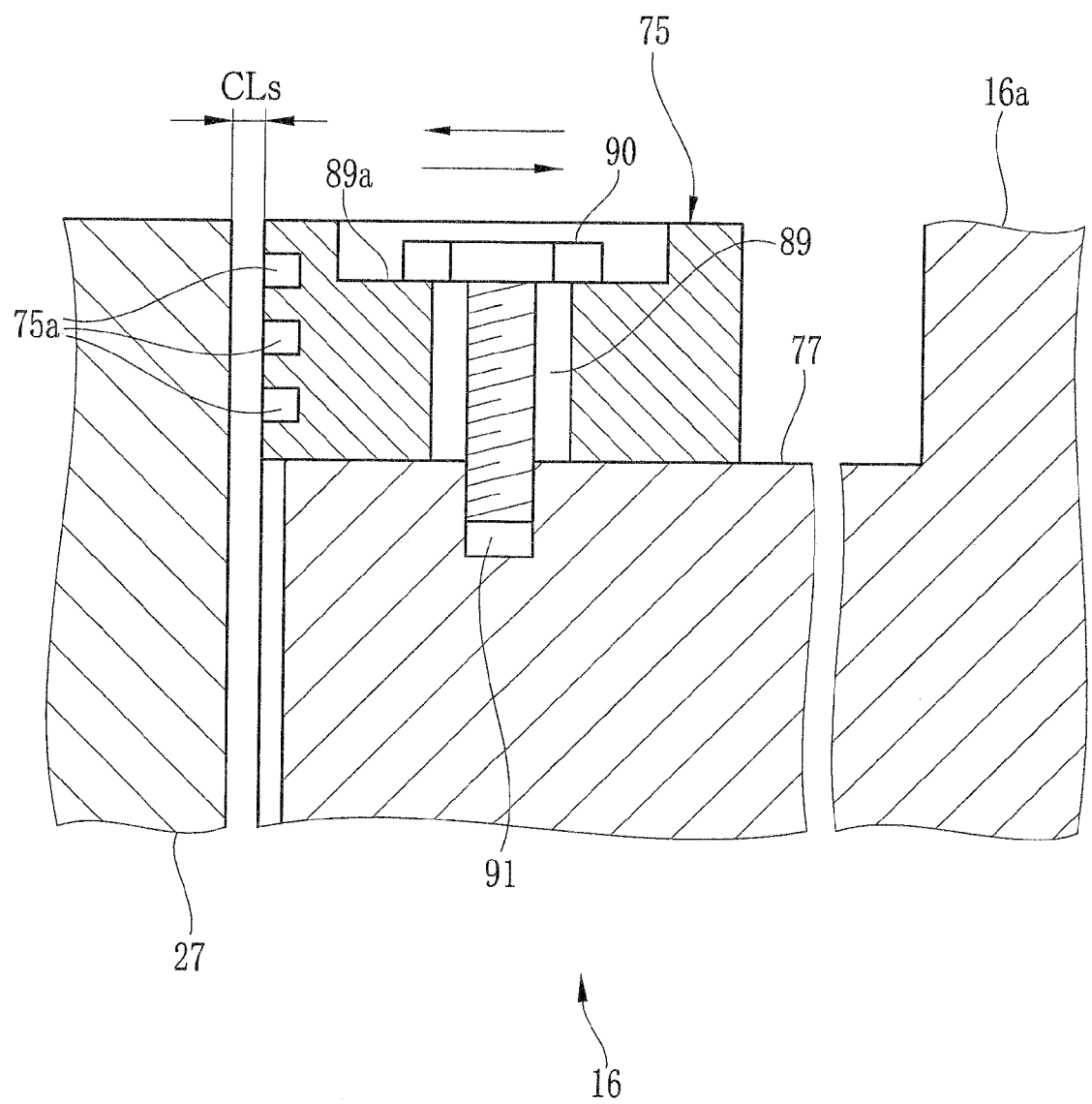
FIG. 10 is an enlarged view of a side labyrinth seal portion fixed with use of a bolt such that its position is adjustable according to another embodiment of the present invention.

Moreover, although the position of the side labyrinth seal portion 75 is adjusted by use of the clearance adjuster 78 (see FIG. 5) in the above embodiment, the present invention is not limited thereto. As shown in FIG. 10 for example, after the insertion hole 89 is formed on the side labyrinth seal portion 75 and the bolt hole 91 is formed on the seal holding portion 77, the clearance is adjusted by loosing the bolt 90. After the adjustment, the bolt 90 is fastened to be fixed.

Hereinafter, the present invention is explained in detail by referring to Examples and Comparative Examples. However, the present invention is riot limited thereto.

EXAMPLE

The dope 12 for use in the film production was obtained by dissolving a solute composed of cellulose acylate and a slight amount of plasticizer into a solvent composed of a mixed solution containing dichloromethane, methanol, and butanol. The solute ratio in the dope 12 was adjusted so as to be 22.0 wt % to 23.0 wt %. The composition of the solvent (dichloromethane:methanol:butanol) was adjusted so as to be 80 wt % to 95 wt %:7 wt % to 20 wt %:0 wt % to 3 wt %.

Next, the film 14 was produced by use of the dope production apparatus 10 shown in FIG. 1. An adequate amount of the dope 12 was supplied to the casting die 25 from the dope production apparatus 11, and then the dope 12 was discharged as the casting bead 12a onto the rotating casting drum 27 through the discharge port of the casting die 25. Thereby, the casting film 13 was formed on the peripheral surface of the casting drum 27. The discharge amount of dope 12 (casting bead 12a) was adjusted such that the thickness of the dried film 14 became 80 μm. Moreover, the air in the upstream side from the casting bead 12a was sucked to be decompressed by the decompression chamber 33 such that the pressure in the upstream side is lower than that in the downstream side in a range of 400 Pa to 2000 Pa.

In the casting die 25, the length of the discharge port was 1900 mm, and the width thereof (slit width) was 1 mm. The clearance between the discharge port of the casting die 25 and the peripheral surface of the casting drum 27 was adjusted to 5 mm. The width of the casting drum 27 was 2280 mm. The rotation speed of the casting drum 27 was 50 m/min or higher. The temperature of the peripheral surface of the casting drum 27 was 0° C. or less. Further, the dry air circulator 69 was actuated to introduce the dry air whose amount corresponded to the rotational speed of the casting drum 27 (film forming speed) was introduced to the drying chamber 58.

After the casting film 13 was solidified, the solidified casting film 13 was peeled from the casting drum 27 by use of the peeling roller 29 to form the wet film 35. The wet film 35 was transported to the transfer section 17 through the pass rollers 37. The wet film 35 after being peeled from the casting drum 27 was transported at a speed 1.03 to 1.20 times as fast as that when being transported on the casting drum 27. The surface temperature of the pass roller 37 was kept at 20° C. or less.

The wet film 35 was transported to the transfer section 17 through the pass roller 37. Note that the wet film 35 after being peeled from the casting drum 27 was transported at a speed 1.03 to 1.20 times as fast as that when being transported on the casting drum 27. The wet film 35 was dried in the transfer section 17 and the tenter device 18, and the side edges of the dried film 14 were cut off by the slitting device 41. Thereafter, the film 14 was dried in the drying chamber 21, and then cooled until its temperature became approximately room temperature. Further, the film 14 was subjected to neutralization by the compulsory neutralization device 47 and knurling by the knurling roller 48, and wound by the winding roller 50 in the winding chamber 23.

Examples 1 to 11

As shown in Table 1 shown below, in Example 1, when the film forming was performed under the condition described above, the clearance CLs (see FIG. 5) was adjusted such that the blowing air speed Vs of the dry air an the like from the clearance CLs of the side labyrinth seal portion 75 became 5 m/sec, and the clearance CL2 was adjusted such that the blowing air speed V2 of the dry air an the like from the clearance CL2 of the second labyrinth seal portion 62 toward the casting bead 12a became 3 m/sec. Further, the clearance CL1 was adjusted such that the blowing air speed V1 of the dry air and the like from the first labyrinth seal portion 60 became 5 m/at most sec, and the clearance CL3 was adjusted such that the blowing air speed V3 of the dry air and the like from the third labyrinth seal portion 64 became at most 5 m/sec.

The blowing air speed was measured by Anemomaster (produced by KANOMAX Japan Inc.).

In Examples 2 to 7, basically, the film was formed under the same condition as that in Example 1. However, in Example 2, the clearances CLs was adjusted such that the blowing air speed Vs became 3 m/sec, and the clearances CL2 was adjusted such that the blowing air speed V2 became 1 m/sec.

In Example 3, the clearances CLs was adjusted such that the blowing air speed Vs became 1 m/sec, and the clearances CL2 was adjusted such that the blowing air speed V2 became 5 m/sec. In Example 4, the clearances CLs was adjusted such that the blowing air speed Vs became 1 m/sec, and the clearances CL2 was adjusted such that the blowing air speed V2 became 1 m/sec.

In Example 5, the clearances CLs was adjusted such that the blowing air speed Vs became 5 m/sec, and the clearances CL2 was adjusted such that the blowing air speed V2 became 5 m/sec. In Example 6, the clearances CLs was adjusted such that the blowing air speed Vs became 2 m/sec, and the clearances CL2 was adjusted such that the blowing air speed V2 became 3 m/sec. In Example 7, the clearances CLs was adjusted such that the blowing air speed Vs became 3 m/sec, and the clearances CL2 was adjusted such that the blowing air speed V2 became 4 m/sec.

In Example 8, basically, the film was formed under the same condition as that in Example 4. However, in Example 8, the clearance CL1 was adjusted such that the blowing air speed V1 of the dry air and the like from the clearance CL1 of the first labyrinth seal portion 60 became 6 m/sec. Similarly, in Example 9, the clearances CL1 was adjusted such that the blowing air speed V1 became 1 m/sec.

In Example 10, basically, the film was formed under the same condition as that in Example 4. However, in Example 10, the clearance CL3 was adjusted such that the blowing air speed V3 of the dry air and the like from the clearance CL3 of the third labyrinth seal portion 64 became 6 m/sec. Similarly, in Example 11, the clearances CL3 was adjusted such that the blowing air speed V3 became 10 m/sec.

Comparative Examples 1 to 11

As shown in Table 2 below, in Comparative Examples 1 to 6, basically, the film was formed under the same condition as that in Example 1. However, one of the blowing air speeds Vs and V2 was set to exceed 5 m/sec. In Comparative Example 1, the clearances CLs was adjusted such that the blowing air speed Vs became 7 m/sec, and the clearances CL2 was adjusted such that the blowing air speed V2 became 3 m/sec. In Comparative Example 2, the clearances CLs was adjusted such that the blowing air speed Vs became 5 m/sec, and the clearances CL2 was adjusted such that the blowing air speed V2 became 7 m/sec.

In Comparative Example 3, the side labyrinth seal portion 75 is not disposed, or the side labyrinth seal portion 75 is located sufficiently away from the casting drum 27, and thereby the blowing air speed Vs became 20 m/sec. Further, the clearance CL2 was adjusted such that the blowing air speed V2 became 1 m/sec. In Comparative Example 4, the clearance CLs was adjusted such that the blowing air speed Vs became 1 m/sec. Further, the second labyrinth seal portion 62 is not disposed, or the second labyrinth seal portion 75 is located sufficiently away from the casting drum 27, and thereby the blowing air speed V2 became 20 m/sec. In Comparative Example 5, the clearance CLs was adjusted such that the blowing air speed Vs became 6 m/sec, and the clearance CL2 was adjusted such that the blowing air speed V2 became 5 m/sec. In Comparative Example 6, the clearance CLs was adjusted such that the blowing air speed Vs became 5 m/sec, and the clearance CL2 was adjusted such that the blowing air speed V2 became 6 m/sec.

In Comparative Example 7, each of the blowing air speeds V1 and V2 is 3 m/sec. However the clearance CL1 was adjusted such that the blowing air speed V1 of the dry air and the like from the clearance CL1 of the first labyrinth seal portion 60 became 12 m/sec, and the clearance CL3 was adjusted such that the blowing air speed V3 of the dry air and the like from the clearance CL3 of the third labyrinth seal portion 64 became 6 m/sec.

In Comparative Example 8, basically, the film was formed under the same condition as that in Example 4. However, in Comparative Example 8, the clearance CL1 of the first labyrinth seal portion 60 was adjusted such that the blowing air speed V1 became 11 m/sec. Similarly, in Comparative Example 9, the first labyrinth seal portion 60 is not disposed, or the first labyrinth seal portion 60 is located sufficiently away from the casting drum 27, and thereby the blowing air speed V1 became 20 m/sec. In Comparative Example 10, basically, the film was formed under the same condition as that in Example 4. However, in Comparative Example 10, the clearance CL3 of the third labyrinth seal portion 64 was adjusted such that the blowing air speed V3 became 11 m/sec. Similarly, in Comparative Example 11, the third labyrinth seal portion 64 is not disposed, or the side labyrinth seal portion 64 is located sufficiently away from the casting drum 27, and thereby the blowing air speed V3 became 20 m/sec.

In Examples 1 to 11 and Comparative Examples 1 to 11, evaluation about "bead stability" was performed. In the evaluation about "bead stability", deviation amount (amplitude) of the casting bead 12*a* immediately before reaching the peripheral surface of the casting drum 27 was evaluated with eyes from the surface side of the casting drum 27.

Concretely, "bead stability" was evaluated by 4 stages. When the deviation amount of the casting bead 12*a* was less than 0.5 mm, the evaluation is considered as "A", when the deviation amount of the casting bead 12*a* was not less than 0.5 mm and not more than 11.0 mm, the evaluation is considered as "B", when the deviation amount of the casting bead 12*a* was not less than 11.0 mm and not more than 10.0 mm, the evaluation is considered as "C", and when the deviation amount of the casting bead 12*a* was more than 10.0 mm, the evaluation is considered as "D".

In Tables 1 and 2 below, Vs denotes the blowing air speed from the clearance CLs of the side labyrinth seal portion, V1 denotes the blowing air speed from the clearance CL1 of the first labyrinth seal portion, V2 denotes the blowing air speed from the clearance CL2 of the second labyrinth seal portion, and V3 denotes the blowing air speed from the clearance CL3 of the third labyrinth seal portion. Ex denotes Example, and Com denotes Comparative Example. "w/o" denotes a state using no labyrinth seal portion.

As shown Tables 1 and 2, it was confirmed that when each of the blowing air speed Vs from the clearance CLs and the blowing air speed V2 from the clearance CL2 is suppressed to at most 5 m/sec, and each of the blowing air speed V1 from the clearance CL1 and the blowing air speed V3 from the clearance CL3 is suppressed to at most 10 m/sec, the casting bead 12*a* is stabilized. Moreover, it was confirmed that when the blowing air speeds Vs, V1, V2, and V3 from the clearances CLs, CL1, CL2, and CL3 are at most 2 m/sec, at most 5 m/sec, at most 3 m/sec, and at most 5 m/sec respectively, the casting bead 12*a* is further stabilized.

Additionally, the dew point of the solvent vapor at a position deviated from the casting bead 12*a* by 150 mm in the horizontal direction (a direction toward the side wind shielding plate 56, see FIG. 3) was measured with use of OPTICA produced by General Eastern Instruments. As a result, it was confirmed that, while the dew point of the solvent vapor is at most −15° C. in Comparative Examples 1 to 11, the dew point of the solvent vapor is in the range of −15° C. to 0° C. in Examples 1 to 11. Namely, it was confirmed that when the dew point of the solvent vapor increases, the evaporation of the solvent vapor from the casting bead 12*a* can be prevented, and the casting bead 12*a* is stabilized.

TABLE 1

|  | CLs Vs(m/sec) | CL1 V1(m/sec) | CL2 V2(m/sec) | CL3 V3(m/sec) | Bead stability |
|---|---|---|---|---|---|
| Ex 1 | 5 | At most 5 | 3 | At most 5 | B |
| Ex 2 | 3 |  | 1 |  | B |
| Ex 3 | 1 |  | 5 |  | B |
| Ex 4 | 1 |  | 1 |  | A |
| Ex 5 | 5 |  | 5 |  | B |
| Ex 6 | 2 |  | 3 |  | A |
| Ex 7 | 3 |  | 4 |  | B |
| Ex 8 | 1 | 6 | 1 |  | B |
| Ex 9 |  | 10 |  |  | B |
| Ex 10 |  | At most 5 |  | 6 | B |
| Ex 11 |  |  |  | 10 | B |

TABLE 2

|  | CLs Vs(m/sec) | CL1 V1(m/sec) | CL2 V2(m/sec) | CL3 V3(m/sec) | Bead stability |
|---|---|---|---|---|---|
| Com 1 | 7 | At most 5 | 3 | At most 5 | C |
| Com 2 | 5 |  | 7 |  | C |
| Com 3 | 20 "w/o" |  | 1 |  | D |
| Com 4 | 1 |  | 20 "w/o" |  | D |
| Com 5 | 6 |  | 5 |  | C |
| Com 6 | 5 |  | 6 |  | C |
| Com 7 | 3 | 12 | 3 | 6 | C |
| Com 8 | 1 | 11 | 1 | At most 5 | C |
| Com 9 |  | 20 "w/o" |  |  | D |
| Com 10 |  | At most 5 |  | 11 | C |
| Com 11 |  |  |  | 20 "w/o" | D |

The present invention is not to be limited to the above embodiments, and on the contrary, various modifications will be possible without departing from the scope and spirit of the present invention as specified in claims appended hereto.

What is claimed is:

1. A solution casting apparatus comprising:
   a casting drum continuously rotating;
   a casing housing said casting drum;
   a casting die for discharging a dope containing a polymer and a solvent as a casting bead onto a peripheral surface of said casting drum;
   a peeling roller for peeling a casting film as a wet film from said casting drum, said casting film being formed by solidifying said dope, and said wet film being dried to be a film;
   a first partition member provided in an upstream side from said casting die in a rotational direction of said casting drum in said casing, said first partition member being approximately parallel to said casting die;
   a second partition member provided in a downstream side from said casting die in the rotational direction of said casting drum in said casing, said second partition member being approximately parallel to said casting die;
   a third partition member provided in a downstream side from said second partition member in the rotational direction of said casting drum in said casing, said third partition member being approximately parallel to said casting die;
   a chamber formed by said first partition member and said second partition member in said casing so as to surround said casting die;
   a side labyrinth seal portion provided so as to be close to a side end surface of said casting drum, for preventing dry air from entering said chamber through the side end surface of said casting drum;

a clearance adjuster for adjusting a clearance between said side labyrinth seal portion and the side end surface of said casting drum;

a dry air supply duct provided in an upstream side from said peeling roller in the rotational direction of said casting drum;

a dry air exhaust duct provided at the vicinity of said second partition member outside said chamber; and a dry air circulator provided outside said casing, for circulating dry air between a said dry air supply duct and said dry air exhaust duct, wherein a speed of air blowing from outside to said chamber through said side labyrinth seal portion is set to at most 5 m/sec at said side labyrinth seal portion, wherein a first labyrinth seal portion is provided on said first partition member between said first partition member and the peripheral surface of said casting drum, wherein a speed of air blowing from outside to said chamber through said first labyrinth seal portion provided on said first partition member is set to at most 10 m/sec at said first labyrinth seal portion, wherein a second labyrinth seal portion is provided on said second partition member between said second partition member and the peripheral surface of said casting drum, wherein a speed of air blowing from outside to said chamber through said second labyrinth seal portion provided on said second partition member is set to at most 5 m/sec at said second labyrinth seal portion, wherein a third labyrinth seal portion is provided on said third partition member between said third partition member and the peripheral surface of said casting drum, and a speed of air blowing from outside to said chamber through said third labyrinth seal portion provided on said third partition member is set to at most 10 m/sec at said third labyrinth seal portion.

2. A solution casting apparatus defined in claim 1, wherein said chamber has a side wind shielding member provided between said first partition member and said second partition member along the rotational direction of said casting drum.

3. A solution casting method comprising the steps of:

discharging a dope containing a polymer and a solvent as a casting bead from a casting die onto a peripheral surface of a casting drum continuously rotating in a casing, said casing including a chamber formed by a first partition member and a second partition member each approximately parallel to said casting die so as to surround said casting die, said first partition member being provided in an upstream side from said casting die in a rotational direction of said casting drum and said second partition member being provided in a downstream side from said casting die in the rotational direction of said casting drum, a third partition member is provided in a downstream side from said second partition member in the rotational direction of said casting drum in said casing, said third partition member is approximately parallel to said casting die;

peeling a casting film as a wet film from said casting drum by a peeling roller, said casting film being formed by solidifying said dope;

drying said wet film to be a film;

supplying dry air from a dry air supply duct provided in an upstream side from said peeling roller in the rotational direction of said casting drum;

exhausting air in said chamber by a dry air exhaust duct provided at the vicinity of said second partition member outside said chamber;

drying said casting film; and suppressing a blowing air speed of said dry air entering said chamber through the side end surface of said casting drum to at most 5 m/sec by a side labyrinth seal portion provided so as to be close to the side end surface of said casting drum, wherein a first labyrinth seal portion is provided on said first partition member between said first partition member and the peripheral surface of said casting drum, wherein a speed of air blowing from outside to said chamber through said first labyrinth seal portion provided on said first partition member is set to at most 10 m/sec at said first labyrinth seal portion, wherein a second labyrinth seal portion is provided on said second partition member between said second partition member and the peripheral surface of said casting drum, wherein a speed of air blowing from outside to said chamber through said second labyrinth seal portion provided on said second partition member is set to at most 5 m/sec at said second labyrinth seal portion, wherein a third labyrinth seal portion is provided on said third partition member between said third partition member and the peripheral surface of said casting drum, and wherein a speed of air blowing from outside to said chamber through said third labyrinth seal portion provided on said third partition member is set to at most 10 m/sec at said third labyrinth seal portion.

4. A solution casting method as defined in claim 3, wherein said chamber is formed in said casing by said first partition member, said second partition member, and a side wind shielding member provided between said first partition member and said second partition member along the rotational direction of said casting drum.

* * * * *